(12) United States Patent
Lin (10) Patent No.: US 11,439,233 B2
(45) Date of Patent: Sep. 13, 2022

(54) FOLDING SHELF

(71) Applicants: DONGGUAN SOLUTION 33 ELECTRONIC TECHNOLOGY CO., LTD., Dongguan (CN); SOLUTION EXPERT 33 INTERNATIONAL CO., LTD., Tortola (VG); SOLUTION EXPERT 33 INTERNATIONAL CO., LTD. TAIWAN BRANCH, New Taipei (TW); SENSEAGE CO., LTD., Taipei (TW)

(72) Inventor: Ben-Tien Lin, New Taipei (TW)

(73) Assignees: Dongguan Solution 33 Electronic Technology Co., Ltd., Changan Town (CN); Solution Expert 33 International Co., Ltd., Tortola (VG); Solution Expert 33 International Co., Ltd., New Taipei (TW); Senseage Co., Ltd., Taipei (TW)

( * ) Notice: Subject to any disclaimer, the term of this patent is extended or adjusted under 35 U.S.C. 154(b) by 0 days.

(21) Appl. No.: 17/117,552

(22) Filed: Dec. 10, 2020

(65) Prior Publication Data

US 2021/0204695 A1 Jul. 8, 2021

(30) Foreign Application Priority Data

Jan. 6, 2020 (CN) .......................... 202020023513.5

(51) Int. Cl.
*A47B 97/08* (2006.01)
*F16M 11/22* (2006.01)
(Continued)

(52) U.S. Cl.
CPC .............. *A47B 97/08* (2013.01); *A47B 97/04* (2013.01); *F16M 11/22* (2013.01); *A47B 2097/006* (2013.01)

(58) Field of Classification Search
CPC ......... A47B 97/04; A47B 97/08; A47B 97/00; A47B 2097/005; A47B 2097/006;
(Continued)

(56) References Cited

U.S. PATENT DOCUMENTS 845,694 A * 2/1907 Conelly ................. A47B 97/08
248/464
1,675,060 A * 6/1928 Simmons ................ B41J 29/15
248/459

(Continued)

*Primary Examiner* — Nkeisha Smith
(74) *Attorney, Agent, or Firm* — Rosenberg, Klein & Lee (57) ABSTRACT

A folding shelf includes a first sheet body and a second sheet body. The first sheet body has a first block, a second block, a third block, a fourth block, a fifth block and a sixth block. The first block is in a trapezoidal shape and the second block is in a trapezoidal shape and its upper bottom edge is connected to an upper bottom edge of the first block to define an engaged status. The third block is in a triangular shape and connected to one of the side edges of the first block, and the fourth block is in a triangular shape and connected to the other side edge of the first block and configured to be symmetrical to the second block. The fifth block is in a trapezoidal shape and its side edge is connected to one of the side edges of the second block, and the sixth block is in a trapezoidal shape and its side edge is connected to the other side edge of the second block and configured to be symmetrical to the fifth block. The arrangement of the first to sixth blocks allows the first sheet body to from a contour line of a rectangular sheet structure. The edges of the first to sixth blocks can be folded into a shelf. The second sheet body has an area smaller than the first sheet body, and a side of the first sheet body is partially disconnected from the first sheet body. Therefore, users can form the shelf by folding to facilitate the application of placing objects. When the shelf is not in use, the shelf can be maintained as a sheet body to facilitate storage and carrying.

7 Claims, 7 Drawing Sheets

(51) Int. Cl.
*A47B 97/04* (2006.01)
*A47B 97/00* (2006.01)

(58) Field of Classification Search
CPC ......... A47B 5/04; F16M 11/22; E04B 1/2608; A63B 63/004
USPC ........ 248/558, 235, 240, 241, 242, 247, 248
See application file for complete search history.

(56) References Cited

U.S. PATENT DOCUMENTS

| | | | | |
|---|---|---|---|---|
| 5,029,798 A * | 7/1991 | Clark | ................ | A47B 23/044 248/459 |
| 5,165,649 A * | 11/1992 | Neumann | ............ | A47B 23/044 206/45.26 |
| 6,220,555 B1 * | 4/2001 | Chase | ................ | A47F 5/112 248/174 |
| 7,185,869 B2 * | 3/2007 | Smith | ................ | A47B 23/044 248/456 |
| 7,861,995 B2 * | 1/2011 | Liou | ................ | F16M 11/105 248/454 |
| 8,424,829 B2 * | 4/2013 | Lu | ................ | A45C 11/00 248/371 |
| 8,424,830 B2 * | 4/2013 | Yang | ................ | A47B 23/044 248/459 |
| 8,714,510 B2 * | 5/2014 | McCosh | ................ | F16M 11/10 248/460 |
| 8,820,695 B2 * | 9/2014 | Nakada | ................ | A45C 13/1069 248/454 |
| 9,095,061 B2 * | 7/2015 | Coberly | ................ | F16M 13/00 |
| 9,303,810 B2 * | 4/2016 | Adams | ................ | F16M 13/00 |
| 9,308,767 B1 * | 4/2016 | Waldron | ................ | B42D 25/22 |
| 9,332,813 B2 * | 5/2016 | Jiang | ................ | G06F 1/166 |
| 9,901,174 B1 * | 2/2018 | Conrad | ................ | A47B 97/08 |
| 10,992,333 B2 * | 4/2021 | Jackson | ................ | H04B 1/3877 |
| 2012/0037047 A1 * | 2/2012 | Moldovan | ................ | F16M 11/10 108/3 |
| 2012/0211613 A1 * | 8/2012 | Yang | ................ | A45C 11/00 248/174 |
| 2012/0318950 A1 * | 12/2012 | Wilber | ................ | A47B 23/043 248/459 |
| 2013/0020216 A1 * | 1/2013 | Chiou | ................ | G06F 1/1626 206/320 |
| 2013/0043148 A1 * | 2/2013 | Chen | ................ | B65D 61/00 206/45.23 |
| 2013/0048517 A1 * | 2/2013 | Mecchella | ............ | A45C 11/00 206/216 |
| 2013/0146482 A1 * | 6/2013 | Huang | ................ | A47B 23/043 206/45.23 |
| 2013/0175423 A1 * | 7/2013 | Coberly | ................ | H05K 5/03 248/558 |
| 2013/0258586 A1 * | 10/2013 | Shao | ................ | A45C 11/00 361/679.55 |
| 2013/0270413 A1 * | 10/2013 | Wilber | ................ | A47B 23/043 248/558 |
| 2015/0151871 A1 * | 6/2015 | Huang | ................ | G06F 1/1628 206/45.23 |
| 2015/0296643 A1 * | 10/2015 | Lee | ................ | A45C 11/00 206/45.2 |

\* cited by examiner

FOLDING SHELF

The present application claims foreign priority from Application No. 202020023513.5, entitled "FOLDING SHELF", filed on Jan. 6, 2020, which is herein incorporated by reference.

FIELD OF THE INVENTION

The present invention relates to the technical field of shelves, and more particularly to a folding shelf that can be folded into a shelf for the purpose of supporting and displaying various objects during use, and can also be unfolded into a sheet structure to facilitate storage and carrying when the shelf is not in use.

BACKGROUND OF THE INVENTION

With the development of electronic technology, more and more people choose mobile devices such smart phones, laptops, or tablet computers to read, control and use various information such as articles, pictures, etc. Of course, the application of these mobile devices also includes reading physical documents and books. However, these mobile devices are still inconvenient to use due to the structural limitation of the mobile devices, documents and books.

Taking a mobile device as an example, the mobile device is generally used while a user is holding the device, and the user can do so with one hand while controlling and operating the device, and thus restricting the user's hands. The inconvenience becomes more significant in the use of larger electric devices, especially the tablet computers. Of course, the user may also use the mobile device indoors by placing the device on a tabletop flatly to overcome the inconvenience of holding the device all the time during its use. However, such arrangement still has considerable obstacles in screen viewing or operation and affects the reading of screen information due to the issue of ambient light.

Therefore, the problem of how to provide users with a better storage product demands immediate attention and feasible solutions. In addition to the requirement for placing objects, the problem of how to facilitate the users to carry and store objects is also another important factor that should be taken into consideration in order to enhance the overall convenience of the product. In view of the aforementioned problems, the inventor of the present invention based on years of experience in the related industry to conduct research and experiment, and finally conceived and developed a folding shelf in accordance with the present invention, in hope of overcoming the aforementioned drawbacks of the prior art.

SUMMARY OF THE INVENTION

Therefore, it is a primary objective of the present invention to overcome the aforementioned drawbacks of the prior art by providing a folding shelf that can be folded into a required support form to facilitate users to place an object, and also can be unfolded into a body sheet form to store and carry the object when the object is not in use, so as to provide great convenience of use.

To achieve the aforementioned and other objectives, the present invention discloses a folding shelf comprising: a first sheet body, having a first block, a second block, a third block, a fourth block, a fifth block and a sixth block, wherein the first block is in a trapezoidal shape, and the second block is in a trapezoidal shape and has an upper bottom edge coupled to an upper bottom edge of the first block to define an engaged status; the third block is in a triangular shape and coupled to one of the side edges of the first block, and the fourth block is in a triangular shape and coupled to the other side edge of the first block and configured to be symmetrical to the second block; the fifth block is in a trapezoidal shape and has a side edge coupled to one of the side edges of the second block, and the sixth block is in a trapezoidal shape and has a side edge coupled to the other side edge of the second block and configured to be symmetrical to the fifth block, and the first block, the second block, the third block, the fourth block, the fifth block and the sixth block are arranged in a way such that the first sheet body forms a contour line of a rectangular sheet structure, and the edges of the first block, the second block, the third block, the fourth block, the fifth block and the sixth block are folded to define a shelf status; and a second sheet body has an area smaller than the first sheet body, disposed on a side of the first sheet body, and partially coupled to the first sheet body. Therefore, users can store and carry the folding shelf in form of a sheet body when the shelf is not in use, and just need to unfold the first sheet body to form the shelf when it is necessary to use the shelf. In addition, the installation of the second sheet body allows users to place objects for their viewing or use.

Preferably, the second sheet body is coupled to the second block of the first sheet body and used as a basic area for folding to facilitate users to fold related components into a shelf quickly.

Preferably, the second sheet body has at least one stop portion which provides a blocking effect to prevent an object from sliding after the object is placed on the shelf.

Preferably, the stop portion of an embodiment is disposed on a side where the second sheet body is coupled to the first sheet body, so as to allow an object to rest on the shelf formed after the first sheet body is folded, and block the object by the stop portion to prevent slippage.

Based on the aforementioned embodiment, the second sheet body further comprises a card slot formed on a side of the second sheet body that is coupled to the first sheet body, so as to extend the scope of application of the folding shelf.

Preferably, the stop portion is a sheet body partially disconnected from the second sheet body, so that the object placed on the shelf can be blocked by the stop portion when the stop portion is lifted open for use.

In another application of a preferred embodiment of the present invention, the object can be rested on the second sheet body having a carrying surface which is a non-slip surface.

To improve the effectiveness and stability of the fixation of the first sheet body after it is folded, the folding shelf preferably further comprises a plurality of magnetic elements installed to the third block and the fourth block respectively.

In summation of the description above, the folding shelf of the present invention can be folded into a shelf easily and quickly by users and provided for the users to place an object on the shelf in order to use or view the object. When the shelf is not in use, the folding shelf can be maintained in form of a sheet body to facilitate storage and carrying. Obviously, the invention provides a very convenient product. Further, the folding shelf provides the stop portion to block or stop the object placed on the shelf to improve the convenience of use. In addition, the second sheet body has a non-slip carrying surface designed according to different ways of placement or includes a card slot for placing cards.

DESCRIPTION OF THE PREFERRED EMBODIMENTS

To make it easier for people having ordinary skill in the art to understand the technical contents of this invention, the specification accompanied by the drawings is described as follows.

With reference to FIGS. 1A to 3 for the schematic views of the structure and application of a folding shelf in accordance with a preferred embodiment of the present invention respectively, the folding shelf 1 comprises a first sheet body 10 and a second sheet body 11. The first sheet body 10 has a first block 101, a second block 102, a third block 103, a fourth block 104, a fifth block 105 and a sixth block 106, wherein the first block 101 is in a trapezoidal shape, and the second block 102 is in a trapezoidal shape and its upper bottom edge L1 is coupled to an upper bottom edge L2 of the first block 101 to define an engaged status; the third block 103 is in a triangular shape and coupled to one of the lateral sides W1 of the first block 101, and the fourth block 104 is in a triangular shape and coupled with the other lateral side W2 of the first block 101 and configured to be symmetrical to the third block 103; the fifth block 105 is in a trapezoidal shape and its side edge W3 is coupled to one of the side edges W7 of the second block 102, and the sixth block 106 is in a trapezoidal shape and its side edge W4 is coupled to the other side edge W6 of the second block 102 and configured to be symmetrical to the fifth block 105; wherein the first block 101, the second block 102, the third block 103, the fourth block 104, the fifth block 105 and the sixth block 106 are arranged in a way such that the first sheet body 10 forms a contour line of a rectangular sheet structure, and after the folding along the edges of the first block 101, the second block 102, the third block 103, the fourth block 104, the fifth block 105 and the sixth block 106 is completed, a shelf is formed. The second sheet body 11 has an area smaller than the first sheet body 10, and the second sheet body 11 is disposed on a side of the first sheet body 10 and partially disconnected from the first sheet body 10 to serve as a base or resting area for placing an object on the folding shelf 1.

When a user wants to use the shelf, the user simply folds along the edges of the first block 101, the second block 102, the third block 103, the fourth block 104, the fifth block 105 and the sixth block 106 to form the shelf, and then the user can put an object such as a mobile device 2 on the shelf formed by folding the first sheet body 10, or put the object obliquely at the second sheet body 11 for viewing or operating the mobile device 2. When the shelf is not in use, the first sheet body 10 can be restored into a sheet structure to facilitate storage and carrying.

Figure 1A:
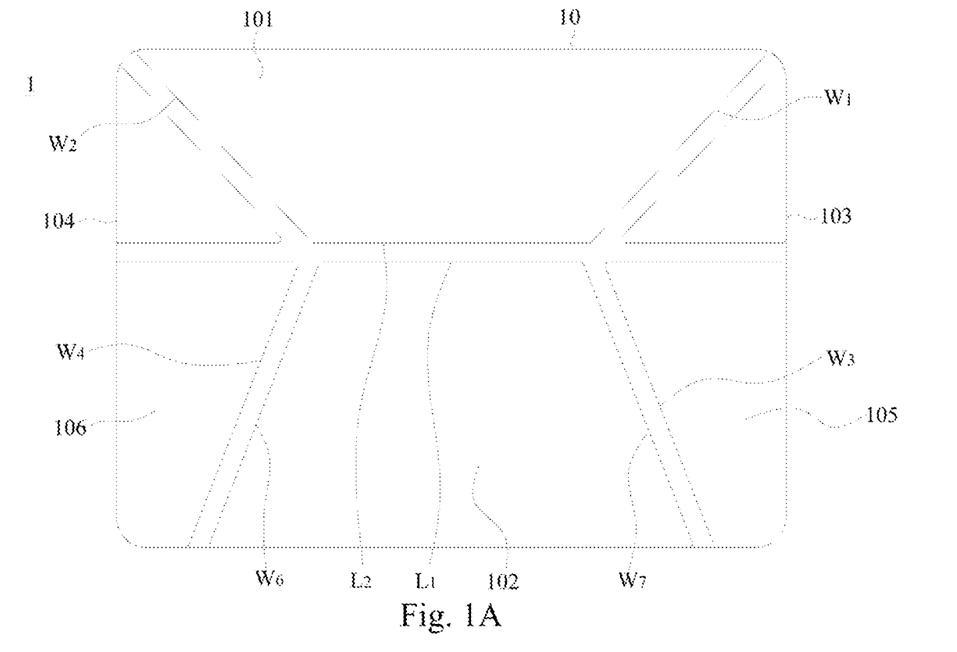
FIG. 1A is a first schematic view showing the structure of a preferred embodiment of the present invention.
Figure 1B:
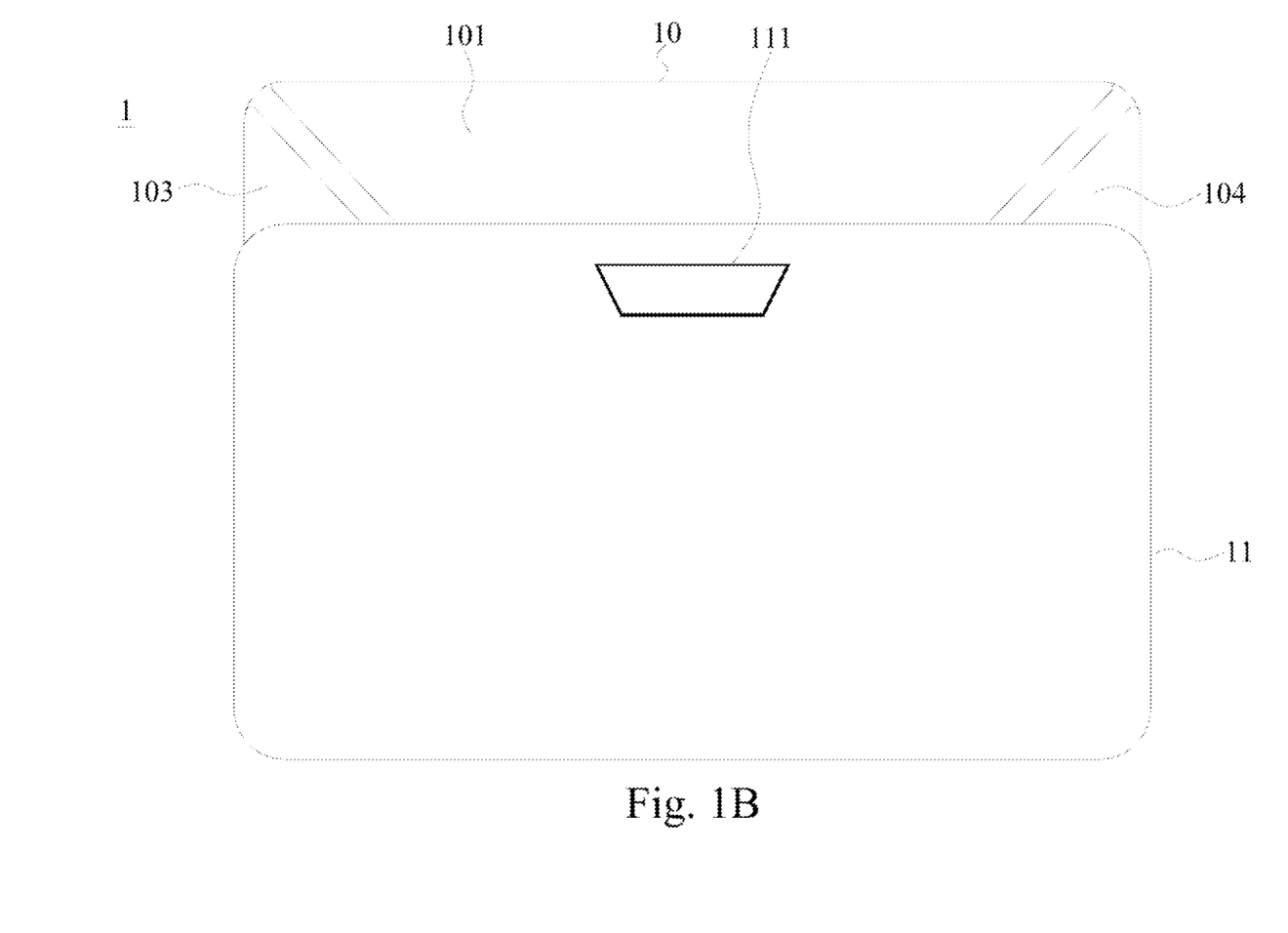
FIG. 1B is a second schematic view showing the structure of a preferred embodiment of the present invention.

Preferably, the second sheet body 11 is coupled to the second block 102 of the first sheet body 10, and the second block 102 can be used as a main reference area for folding the edges of the first block 101, the second block 102, the third block 103, the fourth block 104, the fifth block 105 and the sixth block 106 to form the shelf.

To improve the convenience of use and prevent the object placed on the shelf from sliding, the second sheet body 11 preferably has at least one stop portion 111, so that after the object is placed on the shelf, the stop portion 111 can support and block the edge of the object to position the object on the folding shelf 1 and prevent it from sliding. Wherein, the stop portion 111 can be a part fixed onto the second sheet body 11 or a sheet body partially disconnected from the second sheet body 11. The sheet body partially connected from the second sheet body 11 is used as the stop portion 111 in this embodiment for the purpose of illustrating the present invention. For example, a lower bottom edge of the stop portion 111 (represented by a thinner line in FIGS. 1B and 3) indicates the connected portion of the stop portion 111 and the second sheet body 11 and the remaining side edges (represented by a thicker line) indicates the disconnected portion of the stop portion 111 and the second sheet body 11. In addition, the stop portion 111 can be folded towards the connected side of the second sheet body 11 and the first sheet body 10 or towards a side of the second sheet body 11 relatively coupled to the first sheet body 10 according to application requirements. This preferred embodiment is provided for the purpose of illustrating the present invention, but not intended for limiting the invention.

Figure 3:
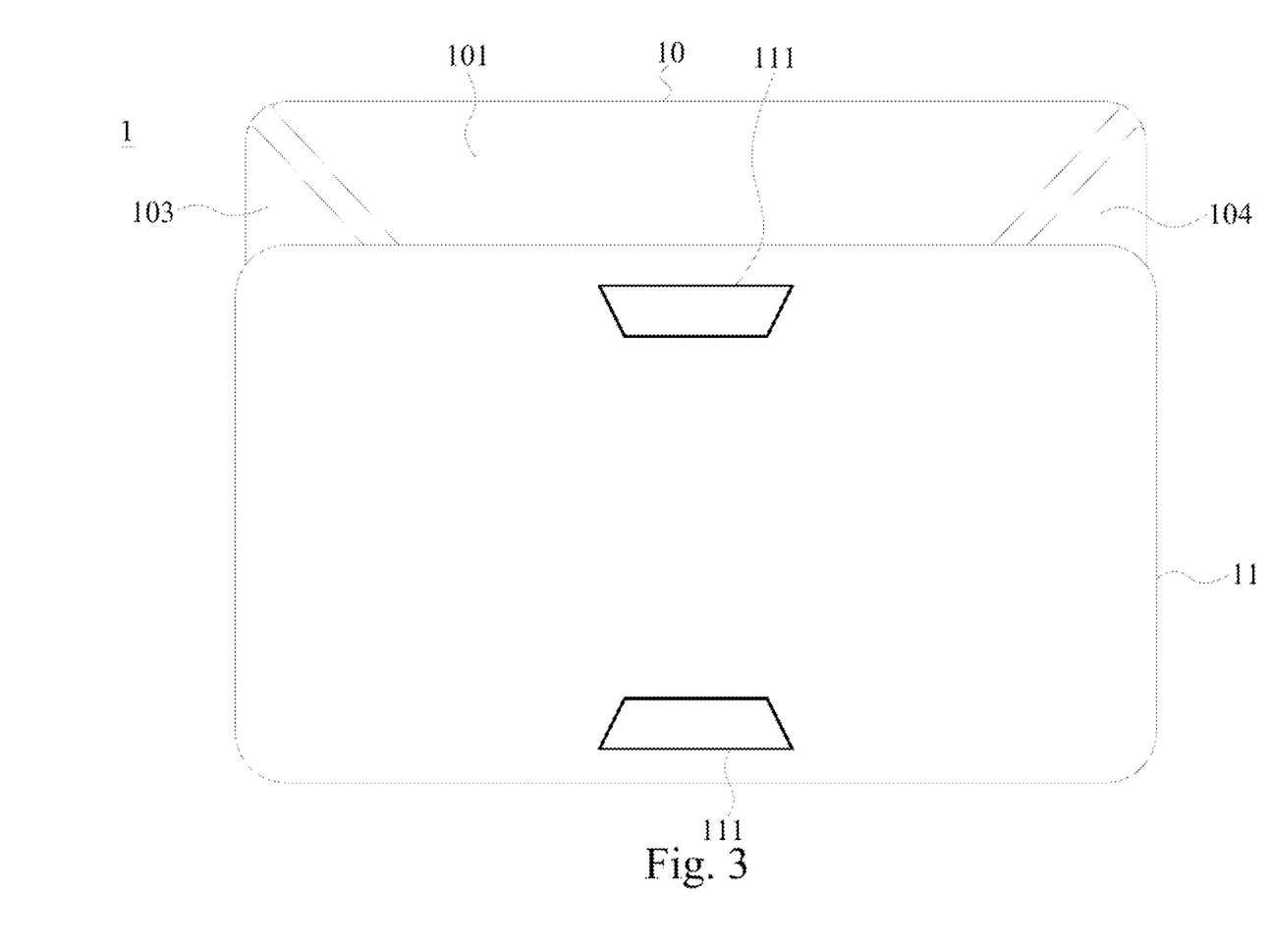
FIG. 3 is a schematic view showing the structure of a preferred embodiment of the present invention having two stop portions.

After the first sheet body 10 is folded along the edges of the first block 101, the second block 102, the third block 103, the fourth block 104, the fifth block 105 and the sixth block 106 to form the shelf, the users may choose to place the object at the first sheet body 10 or the second sheet body 11 for a desired tilted angle. Wherein, the second sheet body 11 has a carrying surface 112 which is a non-slip surface to provide a stable placement of the object rested on the second sheet body 11 and improve the friction for carrying the object, so as to achieve the anti-slip effect. To improve the selectivity of the angle for placing the object, the second sheet body 11 has a plurality of stop portions 111 such as two stop portions 111 disposed opposite to each other, so that after the first sheet body 10 is folded to form the shelf, the object can rest on the second sheet body 11 from different directions as shown in FIG. 3.

Figure 2:
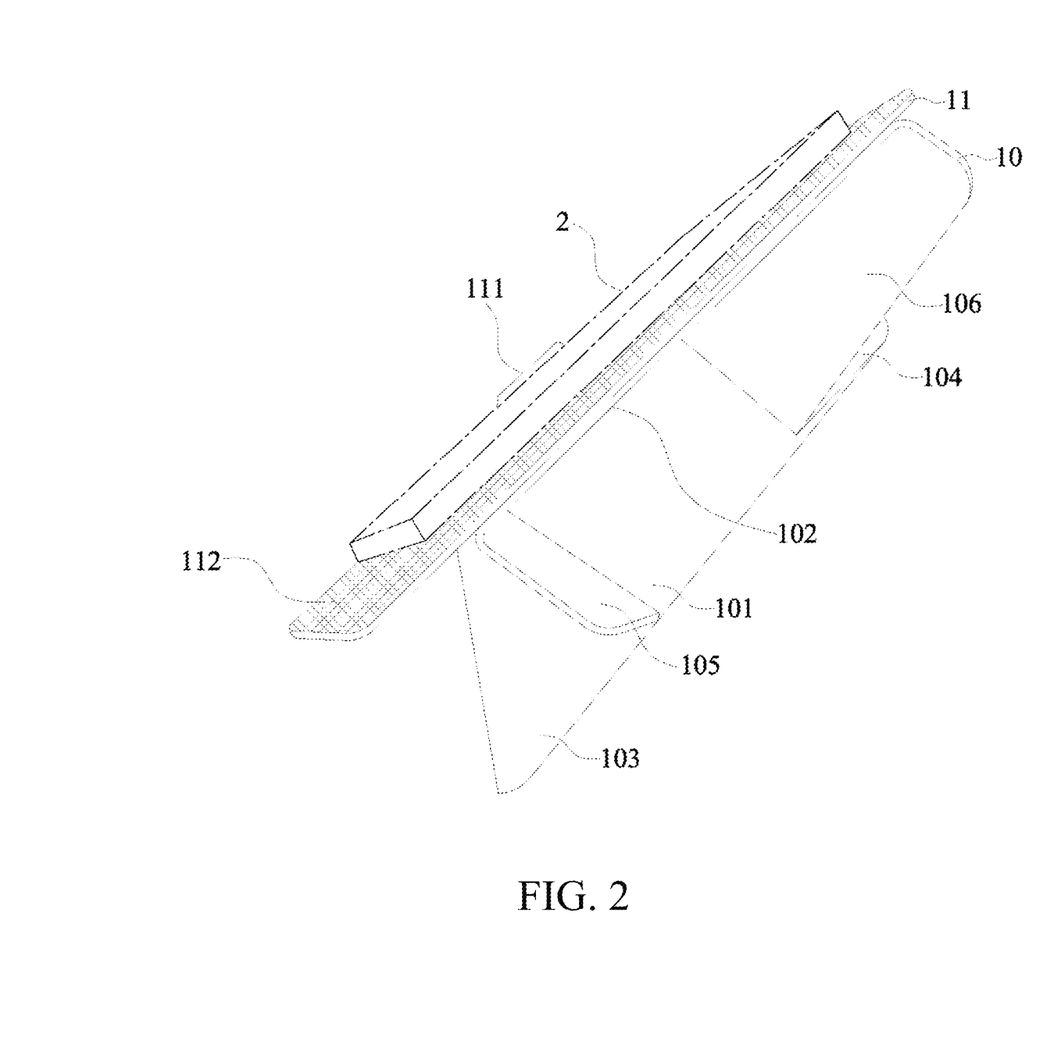
FIG. 2 is a schematic view showing an application of a preferred embodiment of the present invention.

With reference to FIG. 2 for a preferred folding method of using the second block 102 as a base and folding the second block 102 along the connected edges of the third block 103, the fourth block 104 and the first block 101, the third block 103 and the fourth block 104 are stacked with the first block 101, and the third block 103, the fourth block 104, the fifth block 105 and the sixth block 106 are folded along the edges correspondingly. Since the second block 102 and the second sheet body 11 are coupled and fixed to each other, therefore the block is situated at a fixed status. Finally, the first sheet body 10 can be folded to form the shelf as shown in the figure. Now, various different objects or mobile devices such as smart phones can be rested on the carrying surface 112 of the second sheet body 11, and disposed on the carrying surface 112 stably by means of the stop portion 111. Of course, the second sheet body 11 can also be used as the base of the folding shelf 1 in addition to the aforementioned placement method, so that the object can be rested on the first sheet body 10 (which will be described later). In this embodiment, when the object is rested on the first sheet body 10, the stop portion 111 can be folded in the opposite direction to provide a blocking effect to the object.

Figure 4:
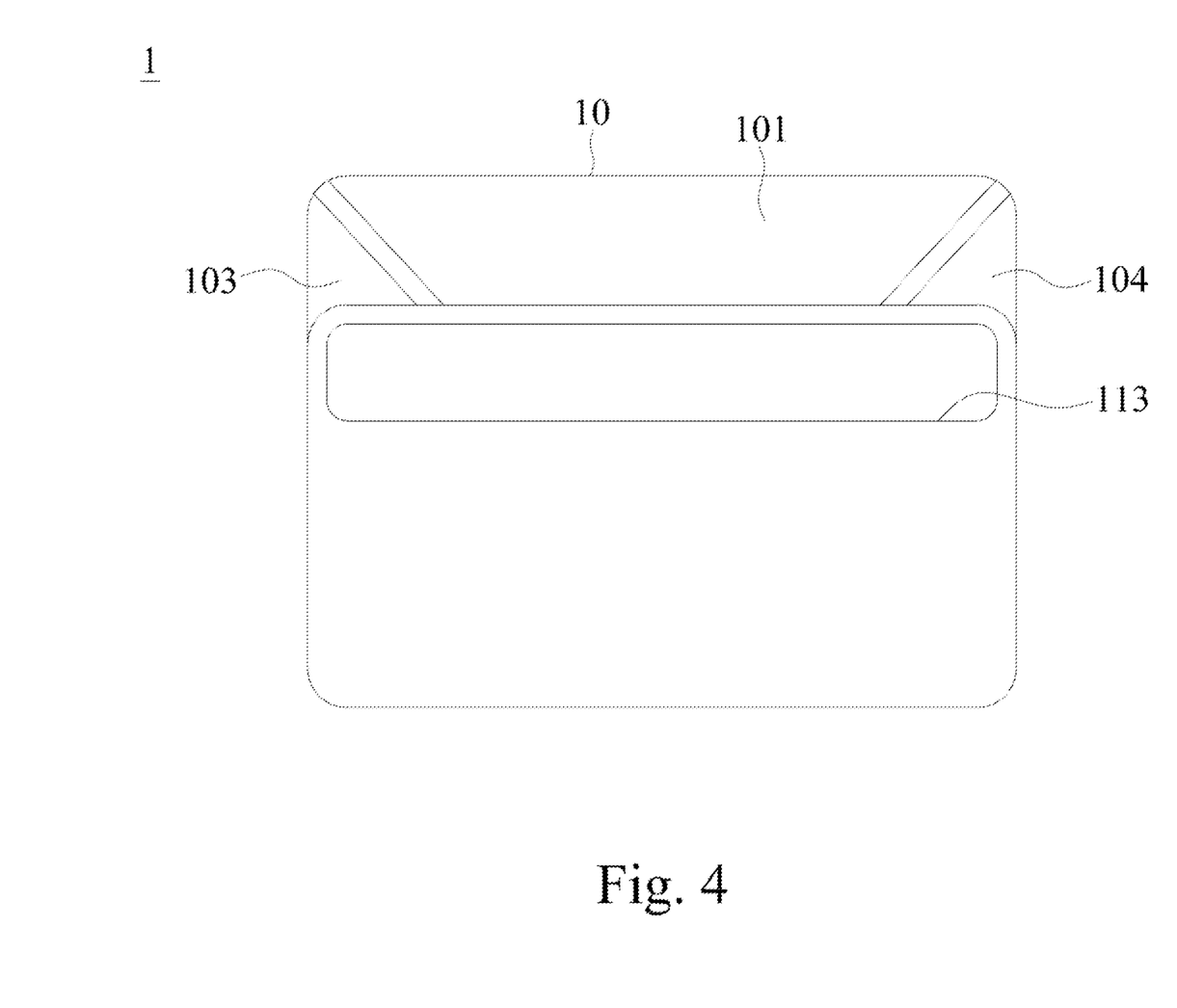
FIG. 4 is a first schematic view showing the structure of another implementation mode of a preferred embodiment of the present invention.
Figure 5:
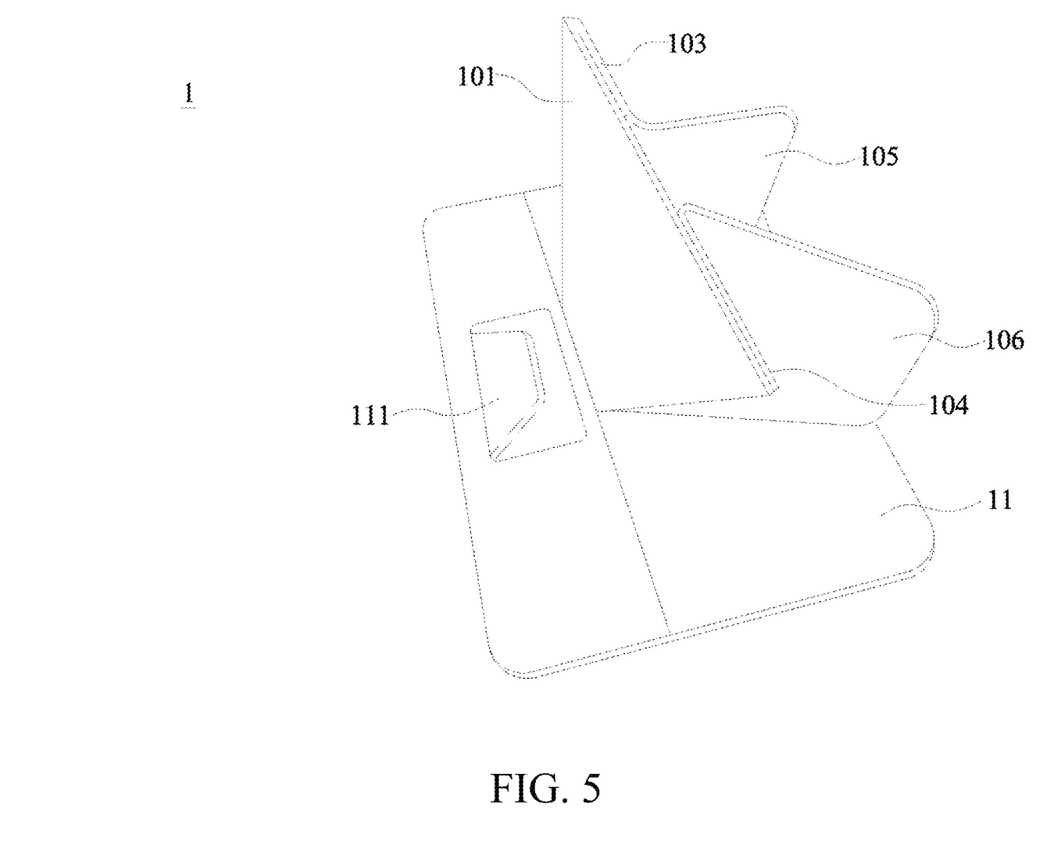
FIG. 5 is a first schematic view showing an application of another implementation mode of a preferred embodiment of the present invention.
Figure 6:
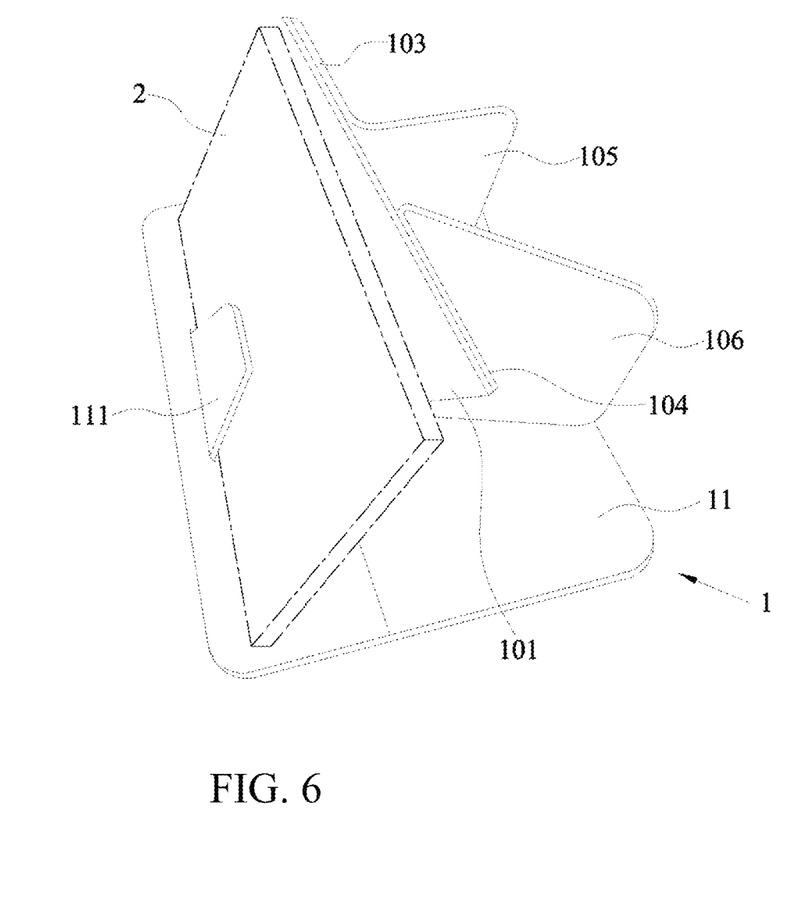
FIG. 6 is a second schematic view showing an application of another implementation mode of a preferred embodiment of the present invention.

With reference to FIGS. 4 to 6 for the schematic views of different structures and applications in accordance with another implementation mode of a preferred embodiment of the present invention respectively, a card slot 113 is formed at a side of the second sheet body 11 coupled to the first sheet body 10 to improve the application performance of the folding shelf 1, and the card slot 113 is provided for the users to put commonly used card items such as credit cards, ATM cards, etc., so as to add another type of stored objects. In this structure, the overall size of the folding shelf 1 can be designed to be substantially equal to the size of the cards. However, this embodiment is just a preferred embodiment only, and the invention is not limited to this embodiment.

In order to avoid affecting the card storage, the stop portion 111 can be arranged on a connected side of the second sheet body 11 and the first sheet body 10, so that after the first sheet body 10 is folded to form the shelf, the object such as the mobile device 2 can be rested on the first sheet body 10, and the bottom of the mobile device 2 can be supported in response to the stop portion 111, and the stop portion 111 can also be a sheet body partially disconnected from the second sheet body 11. It is noteworthy that when the stop portion 111 is a sheet body partially disconnected from the second sheet body 11, a side edge of the stop portion can be coupled to the second sheet body 11 through a cut line (as shown in FIG. 1B), so that the stop portion 111 can be folded towards two directions as needed, or the stop portion 111 of this implementation mode can have a side edge coupled to the second sheet body 11, and the second sheet body 11 is extended outwardly along other side edges of the stop portion 111 a slotted structure.

To improve the fixation of the first block 101, the second block 102, the third block 103, the fourth block 104, the fifth block 105 and the sixth block 106 after folding, the folding shelf 1 further comprises a plurality of magnetic elements 12 installed to the third block 103 and the fourth block 104 respectively for achieving the fixation by magnetic attraction. In this structure, the first block 101, the second block 102, the fifth block 105 and the sixth block 106 can be made of a magnetic material.

In an application as shown in FIG. 5, the first sheet body 10 is folded along the edges of the first block 101, the second block 102, the third block 103, the fourth block 104, the fifth block 105 and the sixth block 106 to form the shelf. Similarly, the second block 102 can be used as a folding base, and after the folding along the edges of the second block 102, the third block 103, the fourth block 104, the fifth block 105 and the sixth block 106 is completed, the third block 103 and the fourth block 104 are stacked on the first block 101. Now, the third block 103 and the fourth block 104 which are magnetic elements 12 can be stacked and fixed to the first block 10, so that the first sheet body 10 can be used to form the shelf. In FIG. 6, the users can place the object on the first block 102 and lift up the stop portion 111 to support the object on the first block 102, wherein the object is a mobile device 2 in this embodiment.

In summation of the description above, the folding shelf 1 of the present invention can be folded into a shelf easily and quickly by users and provided for the users to place an object on the shelf in order to use or view the object. When the shelf is not in use, the folding shelf can be maintained in form of a sheet body to facilitate storage and carrying. Obviously, the invention provides a very convenient product. Further, the folding shelf 1 provides the stop portion 111 to block or stop the object placed on the shelf 1 to improve the convenience of use. In addition, the second sheet body 11 has a non-slip carrying surface 112 designed according to different ways of placement or includes a card slot 113 for placing cards.

While the present invention is described in some detail hereinbelow with reference to certain illustrated embodiments, it is to be understood that there is no intent to limit the invention to those embodiments. On the contrary, the aim is to cover all modifications, alternatives and equivalents falling within the spirit and scope of the invention as defined by the appended claims.

What is claimed is:

1. A folding shelf, comprising:
a first sheet body, having a first block, a second block, a third block, a fourth block, a fifth block and a sixth block, and the first block being in a trapezoidal shape, and the second block being in a trapezoidal shape and having an upper bottom edge coupled to an upper bottom edge of the first block to define an engaged status; the third block being in a triangular shape and coupled to one of two side edges of the first block, and the fourth block being in a triangular shape and coupled to another side edge of the first block and configured to be symmetrical to the third block; the fifth block being in a trapezoidal shape and having a side edge coupled to one of two side edges of the second block, and the sixth block being in a trapezoidal shape and having a side edge coupled to another side edge of the second block and configured to be symmetrical to the fifth block; wherein the first block, the second block, the third block, the fourth block, the fifth block and the sixth block are arranged, such that the first sheet body forms a contour line of a rectangular sheet structure, and edges of the first block, the second block, the third block, the fourth block, the fifth block and the sixth block are folded to define a shelf status; and
a second sheet body, having an area smaller than the first sheet body, and disposed on a side of the first sheet body, and situated in a status of being partially coupled to the first sheet body.

2. The folding shelf as claimed in claim 1, wherein the second sheet body is coupled to the second block of the first sheet body.

3. The folding shelf as claimed in claim 2, wherein the second sheet body has at least one stop portion.

4. The folding shelf as claimed in claim 3, wherein the second sheet body has a card slot relative to a side coupled to the first sheet body.

5. The folding shelf as claimed in claim 4, wherein the stop portion is disposed on a side of the second sheet body which is coupled to the first sheet body.

6. The folding shelf as claimed in claim 2, wherein the second sheet body has a carrying surface which is a non-slip surface.

7. The folding shelf as claimed in claim 1, further comprising a plurality of magnetic elements, and the magnetic elements being installed to the third block and the fourth block respectively.

* * * * *